(12) United States Patent
Chang et al.

(10) Patent No.: US 10,124,891 B2
(45) Date of Patent: Nov. 13, 2018

(54) UNMANNED VEHICLE

(71) Applicants: Inventec Appliances (Pudong) Corporation, Shanghai (CN); Inventec Appliances Corp., New Taipei (TW); Inventec Appliances (Shanghai) Co., Ltd., Shanghai (CN)

(72) Inventors: Jing-Song Chang, New Taipei (TW); Steven Tseng, New Taipei (TW); Zhi-Hong Dai, Shanghai (CN); An-Ping Yang, Shanghai (CN)

(73) Assignees: Inventec Appliances (Pudong) Corporation, Shanghai (CN); Inventec Appliances Corp., New Taipei (TW); Inventec Appliances (Shanghai) Co., Ltd., Shanghai (CN)

( * ) Notice: Subject to any disclaimer, the term of this patent is extended or adjusted under 35 U.S.C. 154(b) by 227 days.

(21) Appl. No.: 15/176,170

(22) Filed: Jun. 8, 2016

(65) Prior Publication Data
US 2017/0029106 A1    Feb. 2, 2017

Related U.S. Application Data

(60) Provisional application No. 62/197,596, filed on Jul. 28, 2015.

(30) Foreign Application Priority Data

May 17, 2016 (CN) .......................... 2016 1 0327865

(51) Int. Cl.
*B64C 37/02* (2006.01)
*B64C 37/00* (2006.01)
(Continued)

(52) U.S. Cl.
CPC .............. *B64C 37/00* (2013.01); *B64C 13/10* (2013.01); *B64C 25/405* (2013.01); *B64C 25/56* (2013.01);
(Continued)

(58) Field of Classification Search
CPC . B64C 2201/027; B64C 35/00; B64C 35/001; B64C 35/002; B64C 35/006; B64C 37/00; B64C 39/024
See application file for complete search history.

(56) References Cited

U.S. PATENT DOCUMENTS 3,159,361 A * 12/1964 Weiland .................. B60V 1/14
                                                              114/279
2008/0001025 A1* 1/2008 Said ........................ B64C 3/385
                                                              244/13

(Continued)

*Primary Examiner* — Richard G Davis
(74) *Attorney, Agent, or Firm* — CKC & Partners Co., Ltd.

(57) ABSTRACT

An unmanned vehicle includes a vehicle body having an accommodating space, an arm assembly coupled to the vehicle body, and a floating member connected to a bottom surface of the vehicle body. The arm assembly includes a first rotating member, a second rotating member coupled to the first rotating member, and a propeller. The propeller includes a rotatable axle coupled to the second rotating member and extending along a rotating axis. The second rotating member can turn the propeller by rotating the rotatable axle about the rotating axis. The first rotating member can rotate and effect a movement of the second rotating member so as to selectively adjust the rotatable axle to align the rotating axis with a first axial direction and a second axial direction. The arm assembly can rotate relative to the vehicle body to selectively rotate into or out of the accommodating space.

17 Claims, 15 Drawing Sheets

(51) Int. Cl.
    *B64C 39/02*          (2006.01)
    *G08G 5/00*           (2006.01)
    *B64C 25/56*          (2006.01)
    *B64C 13/10*          (2006.01)
    *B64C 25/40*          (2006.01)
    *B63B 35/00*          (2006.01)
    *B64C 25/32*          (2006.01)

(52) U.S. Cl.
    CPC ......... *B64C 39/024* (2013.01); *G08G 5/0013* (2013.01); *G08G 5/0069* (2013.01); *B63B 2035/006* (2013.01); *B64C 2025/325* (2013.01); *B64C 2201/027* (2013.01); *B64C 2201/108* (2013.01); *B64C 2201/127* (2013.01); *B64C 2201/146* (2013.01); *Y02T 50/44* (2013.01); *Y02T 50/823* (2013.01)

(56) References Cited

U.S. PATENT DOCUMENTS

| | | | |
|---|---|---|---|
| 2013/0105635 A1* | 5/2013 | Alzu'bi | B64C 39/024 244/23 A |
| 2016/0159471 A1* | 6/2016 | Chan | B64C 39/024 244/39 |
| 2016/0167470 A1* | 6/2016 | Seydoux | B60F 3/0038 244/2 |
| 2016/0176520 A1* | 6/2016 | Goldstein | B64C 39/024 244/17.17 |
| 2016/0272312 A1* | 9/2016 | Mallard | B64C 29/0033 |
| 2017/0253333 A1* | 9/2017 | Baudet | B64C 39/024 |

* cited by examiner

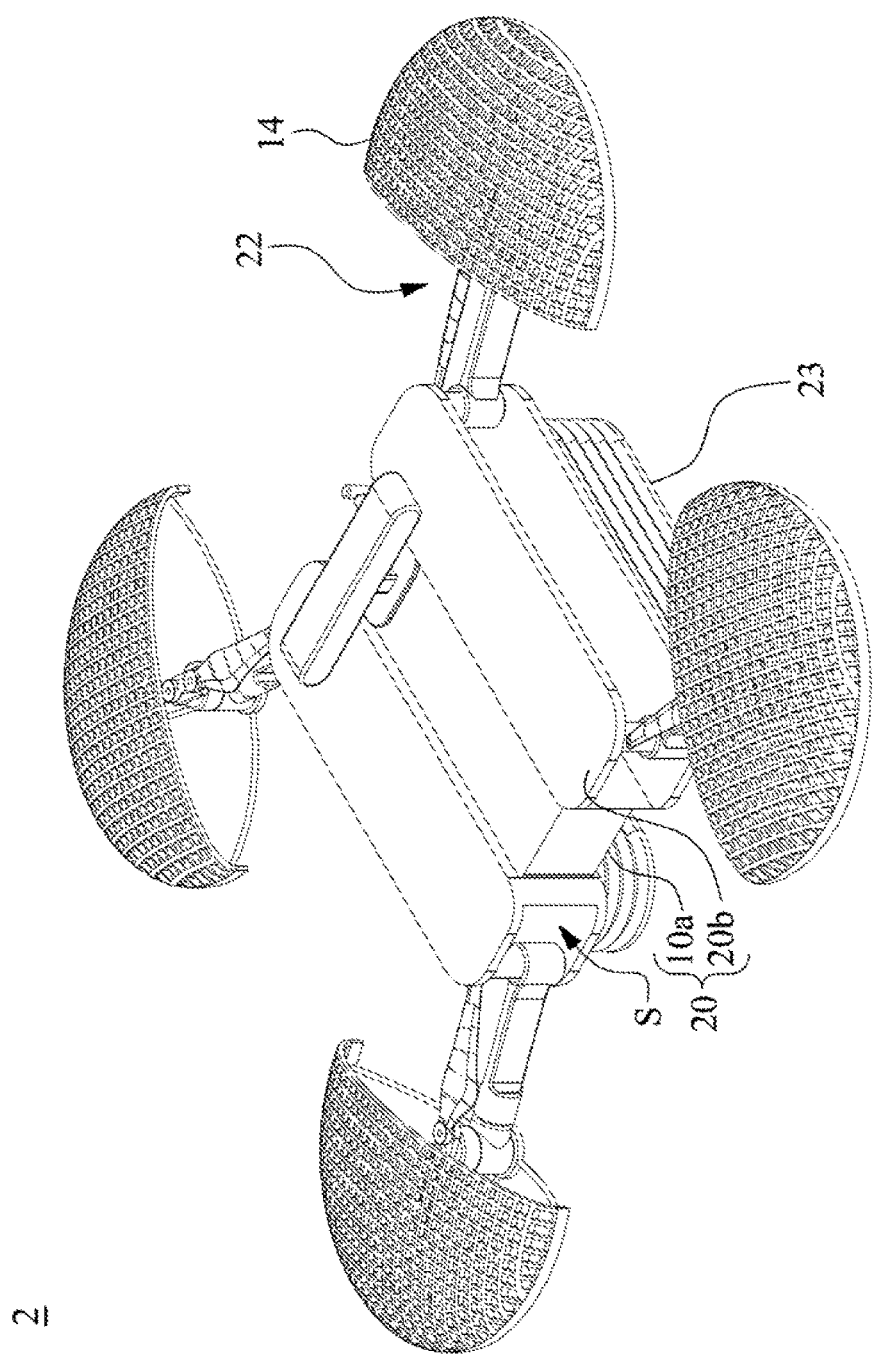

UNMANNED VEHICLE

RELATED APPLICATIONS

This application claims priority to U.S. Provisional Application Ser. No. 62/197,596, filed Jul. 28, 2015 and China Application Number 201610327865.8, filed May 17, 2016, which are herein incorporated by references.

BACKGROUND

Technical Field

The present disclosure relates to an unmanned vehicle.

Description of Related Art

In recent years, unmanned aerial vehicles (UAVs) have been widely used in various fields such as aerial photography, surveillance, scientific research, geological survey, and remote sensing. Typically, the UAVs carry onboard a variety of electrical components used to control various aspects of the operation of the UAVs. At the same time, the UAVs sometimes also need to carry one or more sensors for navigational, surveillance or remote sensing purposes.

However, traditional UAVs are aerial vehicles and can only move in the sky. When the climate is bad or there are obstructions in the aerial pathway, the traditional UAVs are unable to work properly. That is, traditional UAVs are unable to cope with a variety of climate conditions or complex routes.

SUMMARY

According to an embodiment, the disclosure provides an unmanned vehicle. The unmanned vehicle includes a vehicle body, at least one arm assembly, and a floating member. The vehicle body has at least one accommodating space. The arm assembly is coupled to the vehicle body. The arm assembly includes a first rotating member, a second rotating member, and a propeller. The second rotating member is coupled to the first rotating member. The propeller includes a rotatable axle coupled to the second rotating member. The rotatable axle extends along a rotating axis. The second rotating member is configured to turn the propeller by rotating the rotatable axle about the rotating axis. The floating member is connected to a bottom surface of the vehicle body. The first rotating member is configured to rotate and effect a movement of the second rotating member so as to selectively adjust the rotatable axle to align the rotating axis at least with a first axial direction and a second axial direction. The arm assembly is capable of rotating relative to the vehicle body to selectively rotate into or out of the accommodating space.

According to another embodiment, the disclosure provides an unmanned vehicle. The unmanned vehicle includes a vehicle body, at least one arm assembly, and a floating member. The arm assembly is coupled to the vehicle body. The arm assembly includes a first rotating member, a second rotating member, and a propeller. The second rotating member is coupled to the first rotating member. The propeller includes a rotatable axle coupled to the second rotating member. The rotatable axle extends along a rotating axis. The second rotating member is configured to turn the propeller by rotating the rotatable axle about the rotating axis. The floating member is connected to the arm assembly. The first rotating member is configured to rotate and effect a movement of the second rotating member so as to selectively adjust the rotatable axle to align the rotating axis at least with a first axial direction and a second axial direction.

According to yet another embodiment, the disclosure provides a method for controlling an unmanned vehicle. The unmanned vehicle includes a vehicle body, a floating member connected to a bottom surface of the vehicle body, and at least one arm assembly having a propeller comprising a rotatable axle extending along a rotating axis. The method includes at least one of: adjusting the rotatable axle to align the rotating axis with a first axial direction substantially perpendicular to a top surface of the vehicle body, to configure the unmanned vehicle to an aerial vehicle capable of flight by a propelling force of the propeller; and adjusting the rotatable axle to align the rotating axis with a second axial direction substantially orthogonal to the first axial direction, to configure the unmanned vehicle to a navel vehicle capable of sail on the floating member by the propelling force of the propeller.

BRIEF DESCRIPTION OF THE DRAWINGS

FIG. 4 is a perspective view of an unmanned vehicle according to an embodiment of the disclosure;

DETAILED DESCRIPTION

Figure 1A:
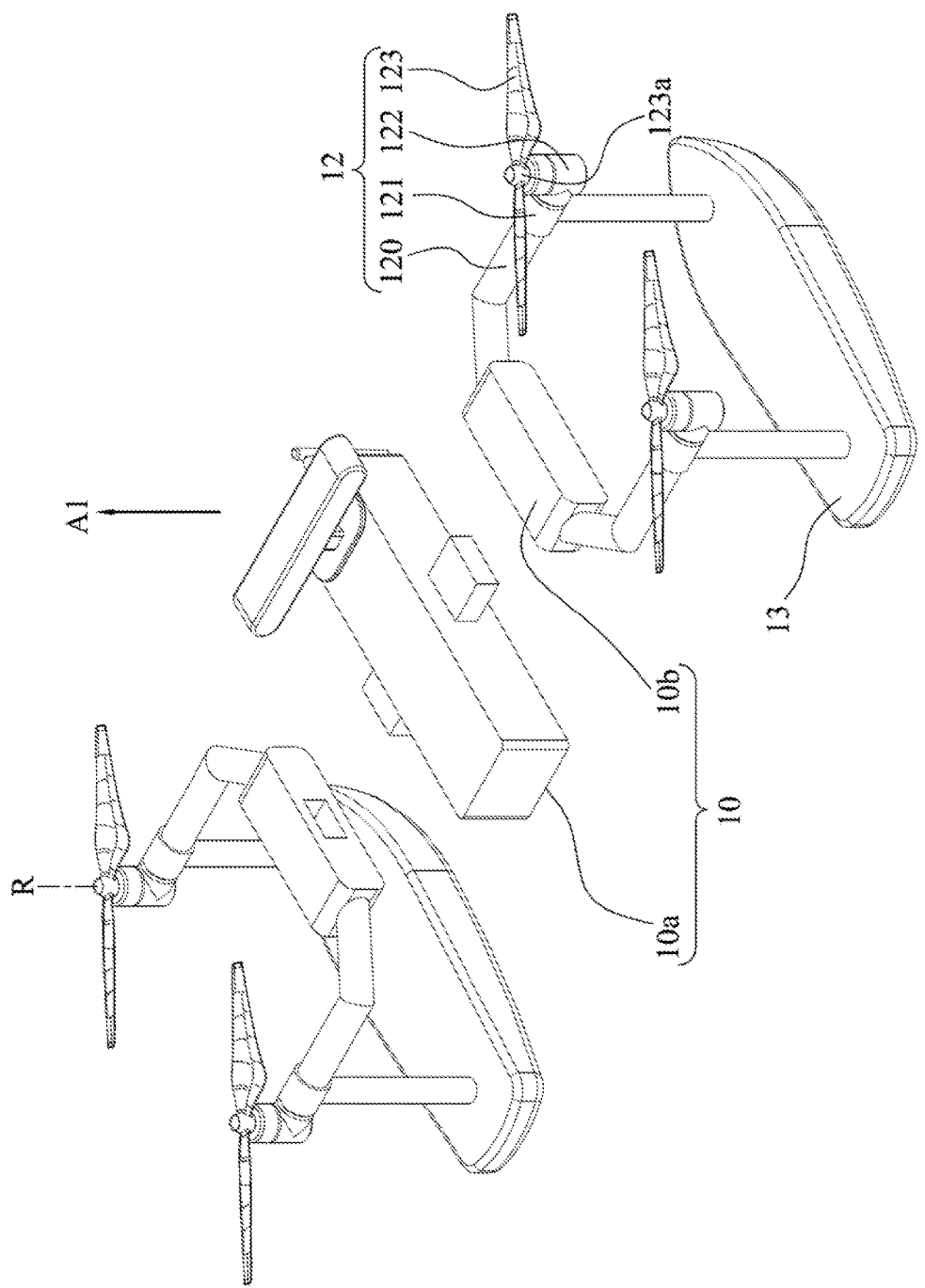
FIG. 1A is an exploded view of an unmanned vehicle according to an embodiment of the disclosure.

The disclosure can be more fully understood by reading the following detailed description of the embodiments, with reference to the accompanying drawings. Wherever possible, the same reference numbers are used in the drawings and the description to refer to the same or like parts.

Figure 1B:
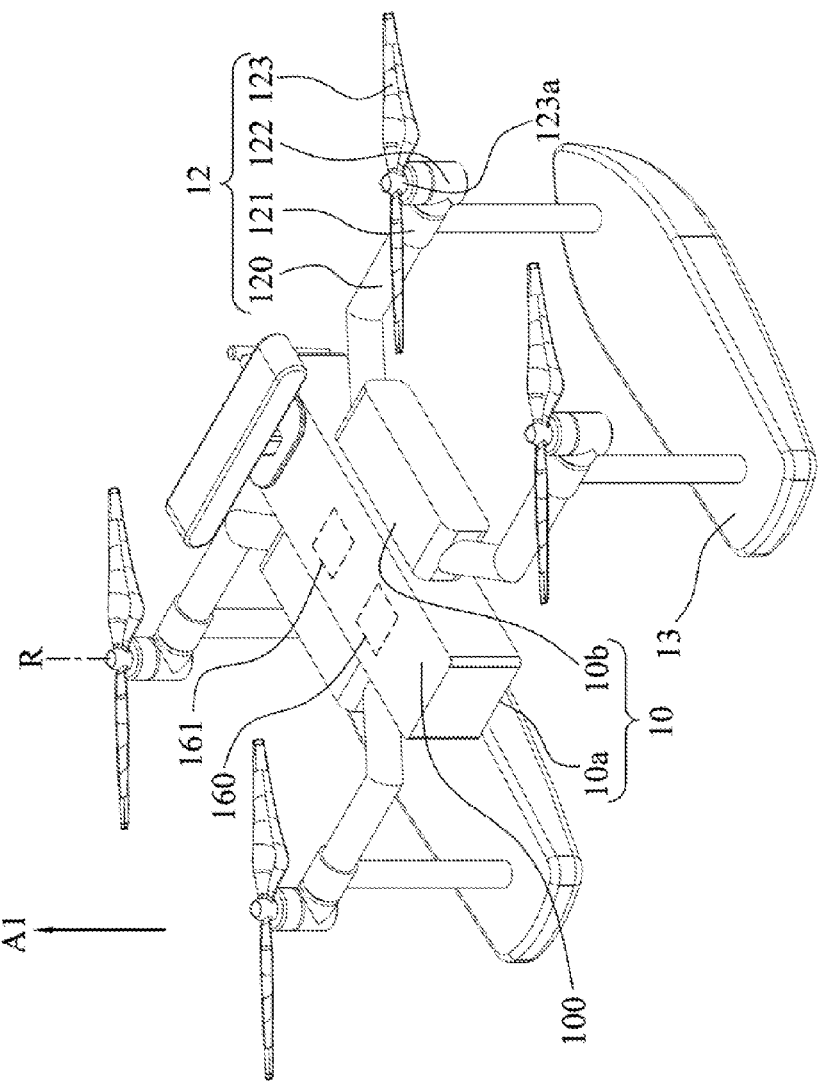
FIG. 1B is a perspective view of the unmanned vehicle shown in FIG. 1A, in which rotating axes of propellers are aligned with a first axial direction.
Figure 1C:
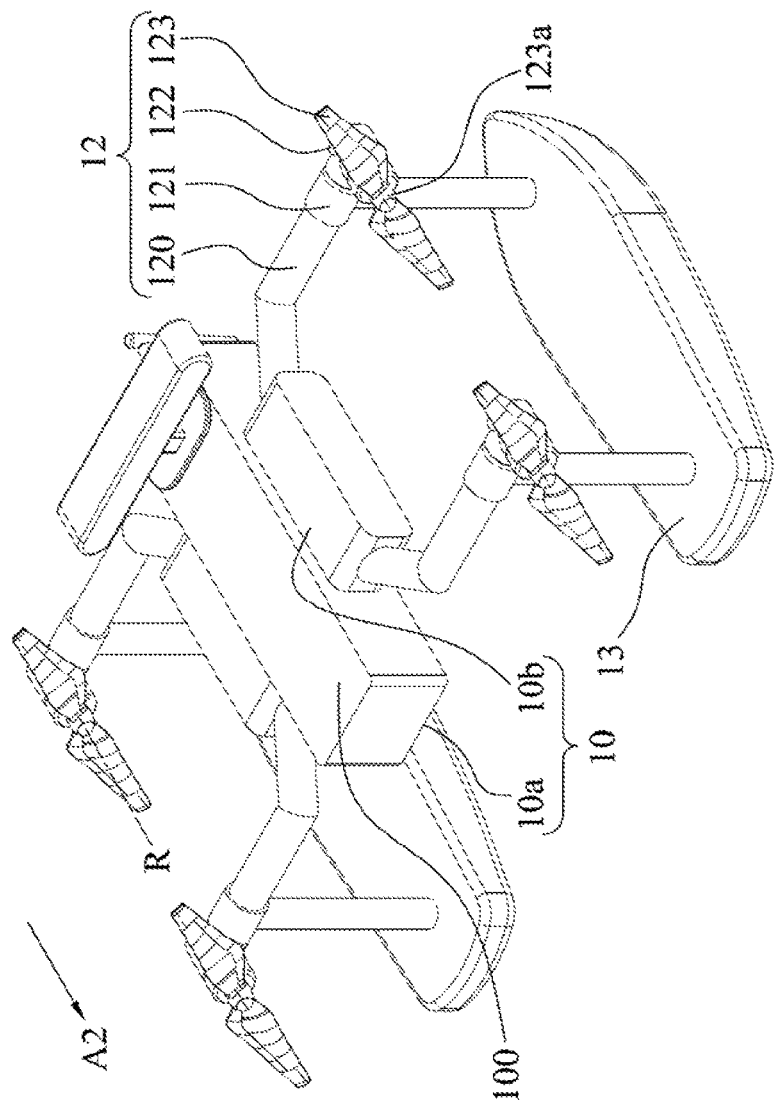
FIG. 1C is another perspective view of the unmanned vehicle shown in FIG. 1A, in which the rotating axes of the propellers are aligned with a second axial direction.

Reference is made to FIG. 1A to FIG. 1C. An unmanned vehicle 1 includes a vehicle body 10 and arm assemblies 12. The vehicle body 10 includes a main module 10a and connecting members 10b. The connecting members 10b are detachably connected to two opposite sides of the main module 10a, respectively. Each of the arm assemblies 12 includes an arm 120, a first rotating member 121, a second rotating member 122, and a propeller 123. The arm 120 is coupled to the corresponding connecting member 10b. The first rotating member 121 is coupled to the arm 120. The second rotating member 122 is coupled to the first rotating member 121. The propeller 123 includes a rotatable axle 123a coupled to the second rotating member 122. The rotatable axle 123a extends along a rotating axis R. The second rotating member 122 is configured to turn the propeller 123 by rotating the rotatable axle 123a about the rotating axis R. The first rotating member 121 is configured to rotate and effect a movement of the adjoining second rotating member 122 so as to selectively adjust the rotatable axle 123a to align the rotating axis R at least with a first axial direction A1 and a second axial direction A2.

In the embodiment shown, there are two connecting members 10b and four arm assemblies 12, with each of the connecting members 10b connecting to two arm assemblies 12. The disclosure is not limited in this regard, for example, it is envisaged that the unmanned vehicle 1 can include one or more connecting members 10b, each having one or more arm assembly 12.

In an embodiment, each of the second rotating members 122 is a power motor, so as to rotate the propeller 123 to provide a propelling force.

As shown in FIG. 1A to FIG. 1C, the first axial direction A1 is vertical and the second axial direction A2 is horizontal. When the rotating axes R of the propellers 123 are generally aligned with the first axial direction A1, the propelling forces provided by the propellers 123 can make the unmanned vehicle 1 levitate, or move up or down, allowing the unmanned vehicle 1 to serve as an aerial vehicle. When the rotating axes R of the propellers 123 are generally aligned with the second axial direction A2, the propelling forces provided by the propellers 123 can make the unmanned vehicle 1 move laterally.

The unmanned vehicle 1 further includes two floating members 13. The floating members 13 are located at the base of the unmanned vehicle 1 and are coupled to the arm assemblies 12. In one embodiment, the floating members 13 are air cushions, so as to allow the unmanned vehicle 1 to float. Alternatively, the floating members 13 may be floating plates or boards including less dense materials, or in any shape, form, or structural configuration which is floatable. As well as being floatable, the floating members 13 are designed to be streamline-shaped. When the propelling forces provided by the propellers 123 make the unmanned vehicle 1 move forward or backward along the second axial direction A2, the streamline-shape of the floating members 13 can reduce resistance to its motion.

Figure 7:
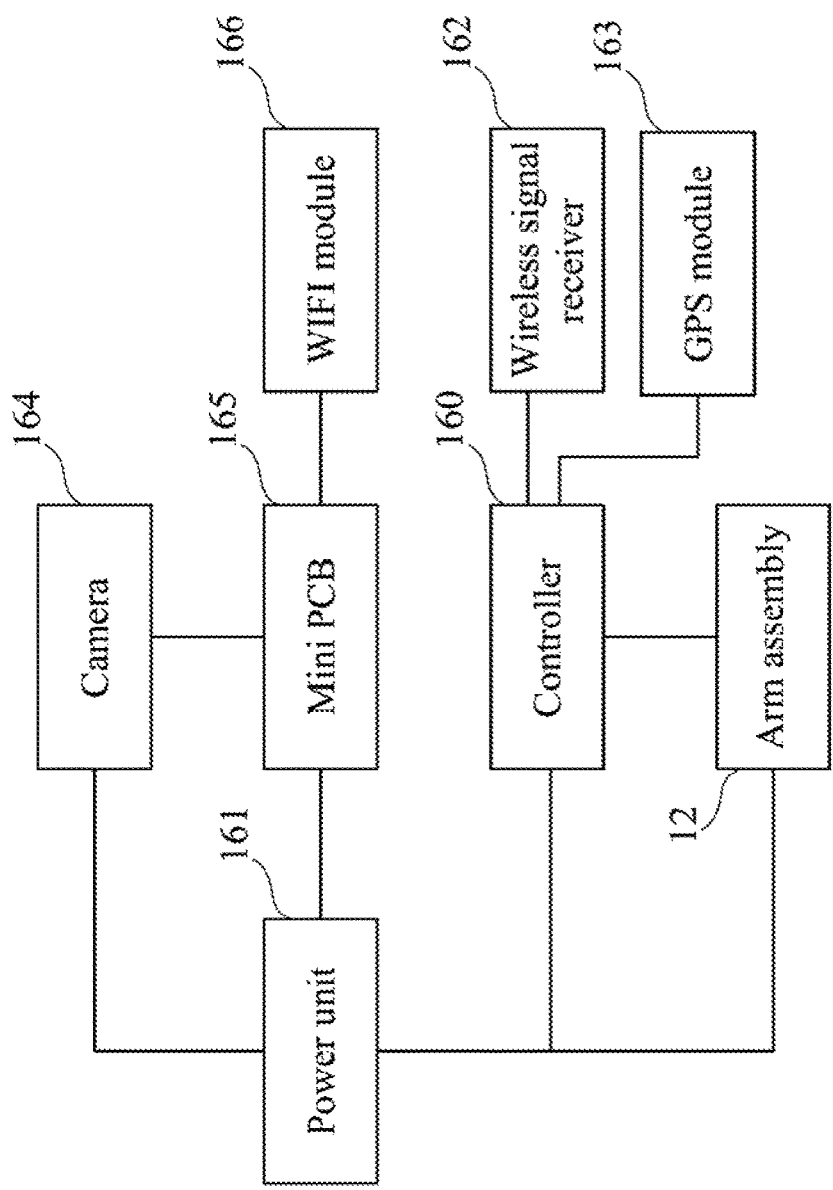
FIG. 7 is a block diagram of the components of an unmanned vehicle according to an embodiment of the disclosure.

As shown in FIG. 1B and also in FIG. 7, in the embodiment, the unmanned vehicle 1 further includes a controller 160 and a power unit 161 (illustrated by dotted lines in FIG. 1B). The controller 160 is disposed in the main module 10a and configured to control the first rotating member 121 and the second rotating member 122. The power unit 161 is disposed in the main module 10a and configured to supply power to the first rotating member 121 and the second rotating member 122.

Alternatively, the power unit 161 can be disposed in the connecting member 10b, so as to reduce the weight of the main module 10a or improve weight distribution across the unmanned vehicle 1.

In some embodiments, the controller 160 is disposed on the vehicle body 10 (e.g., on the main body 10a or the connecting member 10b) and the power unit 161 is disposed on the arm assembly 12. In some embodiments, the power unit 161 is disposed on the vehicle body 10 (e.g., on the main body 10a or the connecting member 10b) and the controller 160 is disposed on the arm assembly 12. In some embodiments, the controller 160 and the power unit 161 are both disposed on the arm assembly 12.

In some embodiments, the controller 160 is further configured to individually control the first rotating members 121 to selectively align the rotating axes R of the propellers 123 with the first axial direction A1 or the second axial direction A2. For example, the controller 160 can adjust the rotatable axles 123a of two of the propellers 123 to align their rotating axes R with the first axial direction A1, and adjust the rotatable axles 123a of the other propellers 123 to align their rotating axes R with the second axial direction A2. Further, the controller 160 is configured to control the rotating members 121 to adjust the rotatable axles 123a of the propellers 123 to change the rotating axes R to different alignments and angles with respect to the first axial direction A1 and second axial direction A2. Other combinations to control and rotate the rotatable axles 123a of the propellers 123 are envisaged, to provide different motion capabilities of the unmanned vehicle 1.

Figure 2:
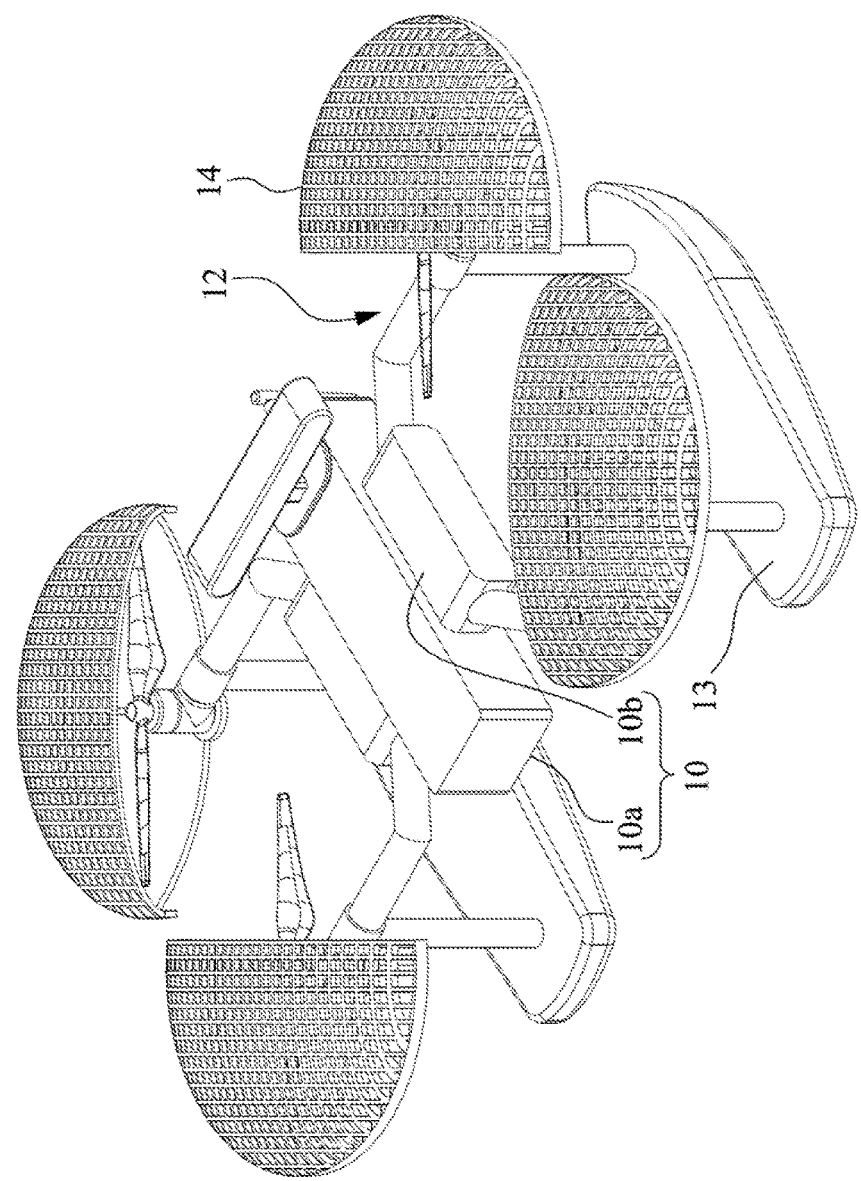
FIG. 2 is a perspective view of an unmanned vehicle according to an embodiment of the disclosure.

Reference is made to FIG. 2. The unmanned vehicle 1 further includes protection shields 14. Each of the protection shields 14 is coupled to the corresponding arm assembly 12 and envelops a corresponding propeller 123. The protection shields 14 may also only cover a portion of the corresponding propeller 123. During the rotation of the propellers 123, the protection shields 14 can protect the propellers 123 from objects that may cause damages to the propellers 123. The embodiment in FIG. 2 shows each of the protection shields 14 as a net structure. Alternative forms include a mesh with larger or smaller apertures, as well as different shapes of apertures. Also, although each of the protection shields 14 is shown in a spherical shape, other design shapes are envisaged, such as having irregular, uneven, edged, or jagged surface. Preferably, each of the protection shields 14 has shape and form that is aerodynamic to reduce air resistance as the unmanned vehicle 1 moves in air. Further, it is preferred that each of the protection shields 14 has suitable apertures size and shapes for airflow through the apertures so as to not diminish the propelling force and effectiveness of the propellers 123.

Reference is made to FIG. 3A to FIG. 3D. An unmanned vehicle 2 includes a vehicle body 20 and arm assemblies 22. The vehicle body 20 includes a main module 10a and connecting members 20b. The connecting members 20b are detachably connected to the sides of the main module 10a. Each of the arm assembly 22 includes an arm 220, a first rotating member 221, a second rotating member 222, a propeller 223, and a shoulder joint 224. The arm 220 is coupled to the corresponding connecting member 20b and configured to move about the shoulder joint 224. The first rotating member 221 is coupled to the arm 220 at a distal end to the shoulder joint 224. The second rotating member 222 is coupled to the adjoining first rotating member 221. The propeller 223 is coupled to the adjoining second rotating member 222 and has a rotatable axle 223a extending along a rotating axis R. The second rotating member 222 is configured to turn the propeller 223 by rotating the rotatable axle 223a about the rotating axis R, and the first rotating member 221 is configured to rotate and effect a movement of the second rotating member 222 so as to selectively adjust the rotatable axle 223a to align the rotating axis R at least with a first axial direction A1 and a second axial direction A2. The connecting member 20b has an accommodating space S, for example a cavity, for receiving the arm assemblies 22. The shoulder joint 224 is adjoined to the connecting member 20b and the arm 220, and is configured to rotate the arm 220 relative to the connecting member 20b, to retract or extend the arm 220 into or out of the accommodating space S. Accordingly, the distance between any two of the propellers 223 can be adjusted and thus the operation of the propellers 223 can be prevented from structural interference.

Figure 3A:
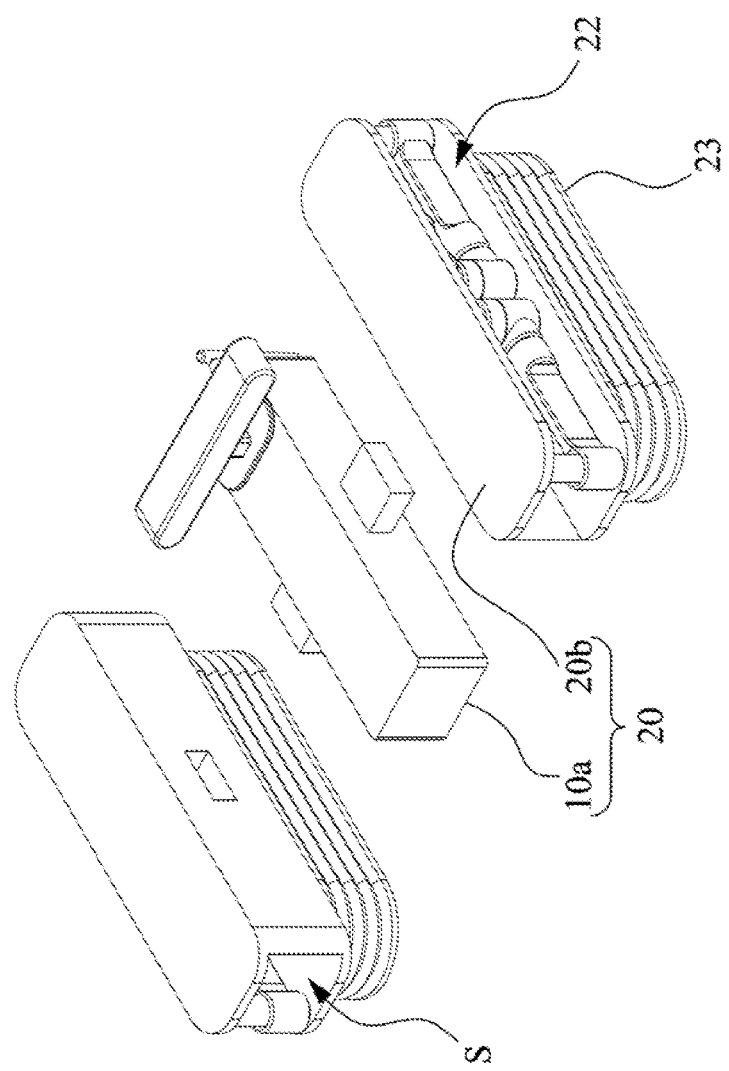
FIG. 3A is an exploded view of an unmanned vehicle according to an embodiment of the disclosure.
Figure 3B:
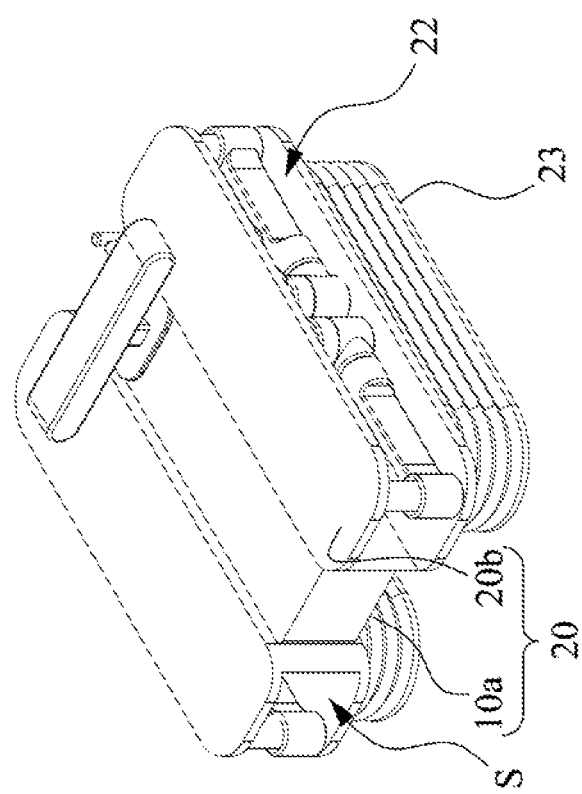
FIG. 3B is a perspective view of the unmanned vehicle shown in FIG. 3A, showing arm assemblies retracted into an accommodating space of the corresponding connecting member.
Figure 3C:
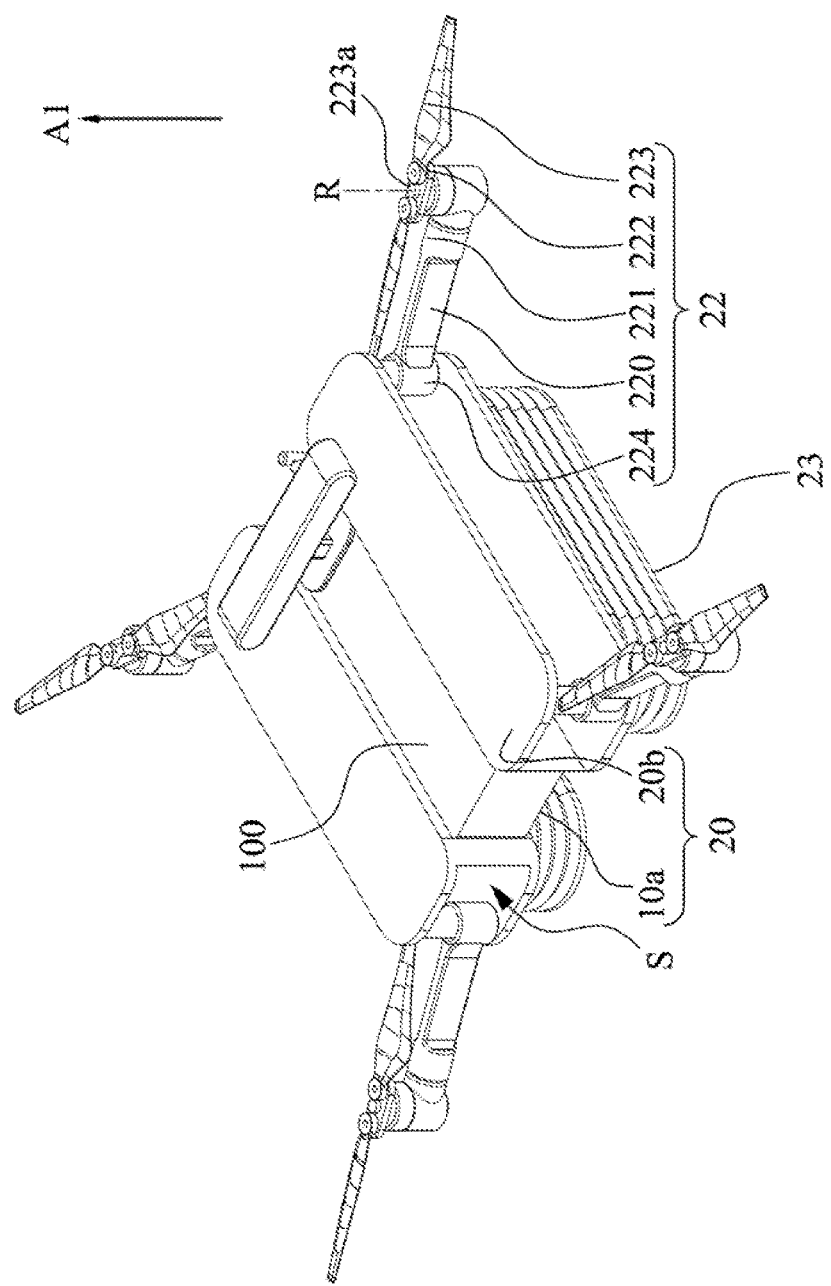
FIG. 3C is another perspective view of the unmanned vehicle shown in FIG. 3A, showing the arm assemblies extended and aligned with a first axial direction.
Figure 3D:
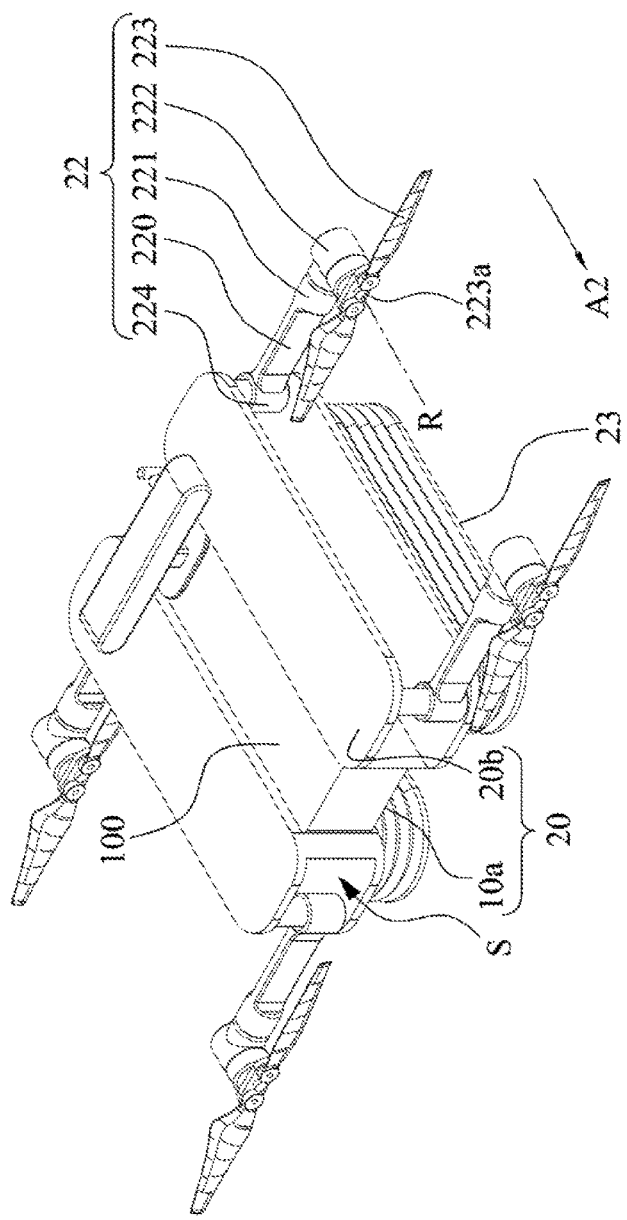
FIG. 3D is another perspective view of the unmanned vehicle shown in FIG. 3C, in which the rotating axes of the propellers are aligned with a second axial direction.

As shown in FIGS. 3C and 3D, the main module 10a has a top surface 100. The first axial direction A1 is substantially perpendicular to the top surface 100, and the second axial direction A2 is substantially orthogonal to the first axial direction A1. In one embodiment, the first axial direction A1 is substantially vertical and the second axial direction A2 is substantially horizontal. When the rotatable axles 223a of the propellers 223 are adjusted to generally align the rotating axes R with the first axial direction A1, the propelling forces provided by the propellers 223 can make the unmanned vehicle 2 move vertically up or down, allowing the unmanned vehicle 2 to be configured as an aerial vehicle and capable of flight. When the rotatable axle 223a of the propellers 223 are adjusted to generally align the rotating axes R with the second axial direction A2, the propelling forces provided by the propellers 223 can make the unmanned vehicle 2 move laterally forwards/backwards or sideways. Variations of the propeller angles to enable a variety of vehicle movements are envisaged in this disclosure.

The extension and retraction of the arm 220 allows for a variety of operational modes and flexibility for controlling the unmanned vehicle 2. By extending/retracting the arms 220 in different configurations and combinations, the unmanned vehicle 2 may achieve improved maneuverability. Further, when navigating the unmanned vehicle 2 through more confined spaces, the retraction of the arm 220 transforms the unmanned vehicle 2 into a smaller size vehicle and able to fit through tighter spaces. Further, when the unmanned vehicle 2 is not in use, the retracted arms allow the unmanned vehicle 2 to occupy a smaller space for transport and storage.

In an embodiment, the unmanned vehicle 2 includes floating members 23 coupled to the connecting members 20b. The floating members 23 located at the base of the unmanned vehicle 2 allow it to operate like a naval vehicle, similar to the previously described embodiments. Shown in FIG. 4, according to an embodiment of the present disclosure, the unmanned vehicle 2 includes protection shields 14 which serve to protect the propellers 223 from foreign objects. Different possible designs, shapes, forms and configurations of the protection shields 14 have been previously described, and will not be repeated to avoid duplicity.

Figure 5A:
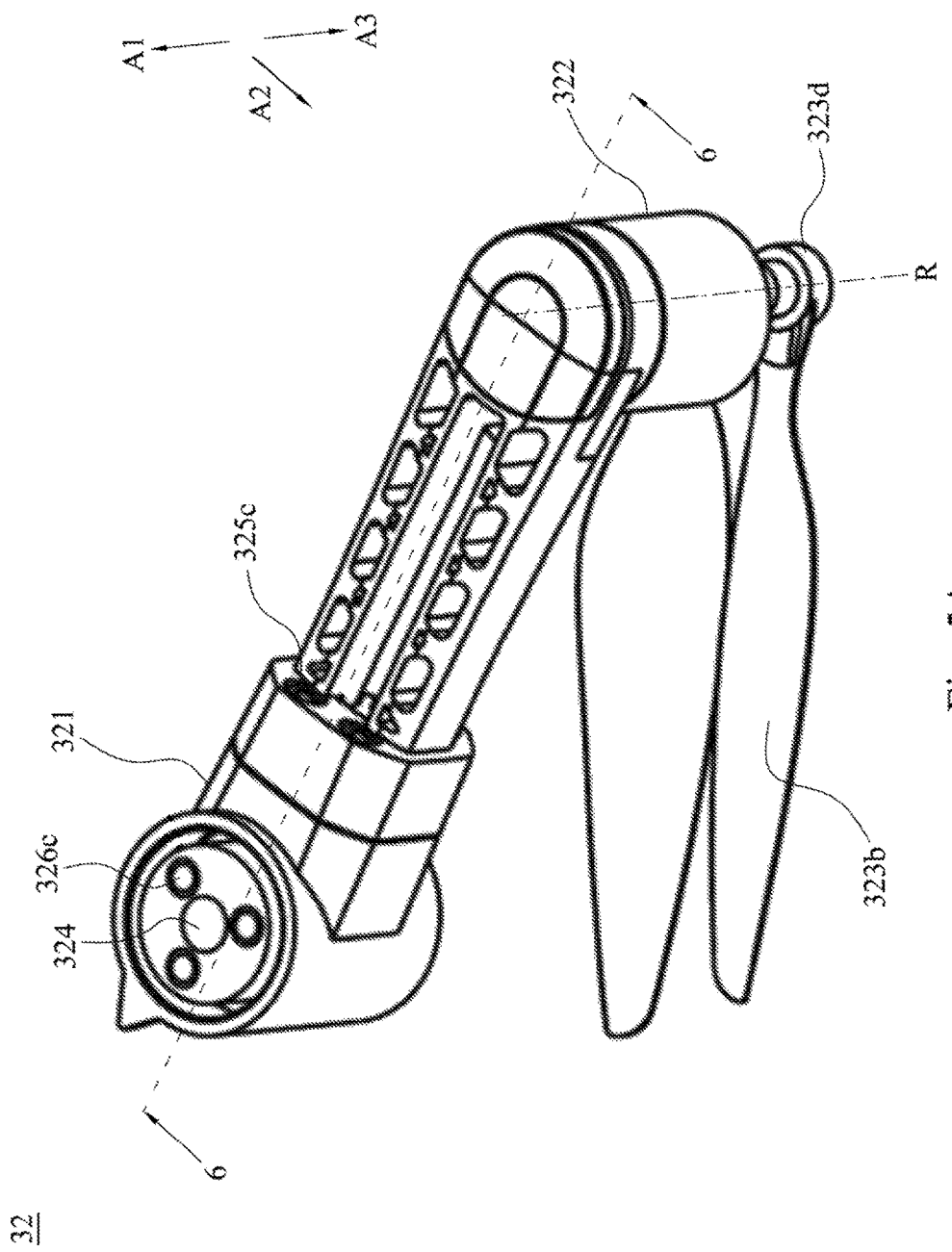
FIG. 5A is a perspective view of an arm assembly shown according to an embodiment of the disclosure.
Figure 5B:
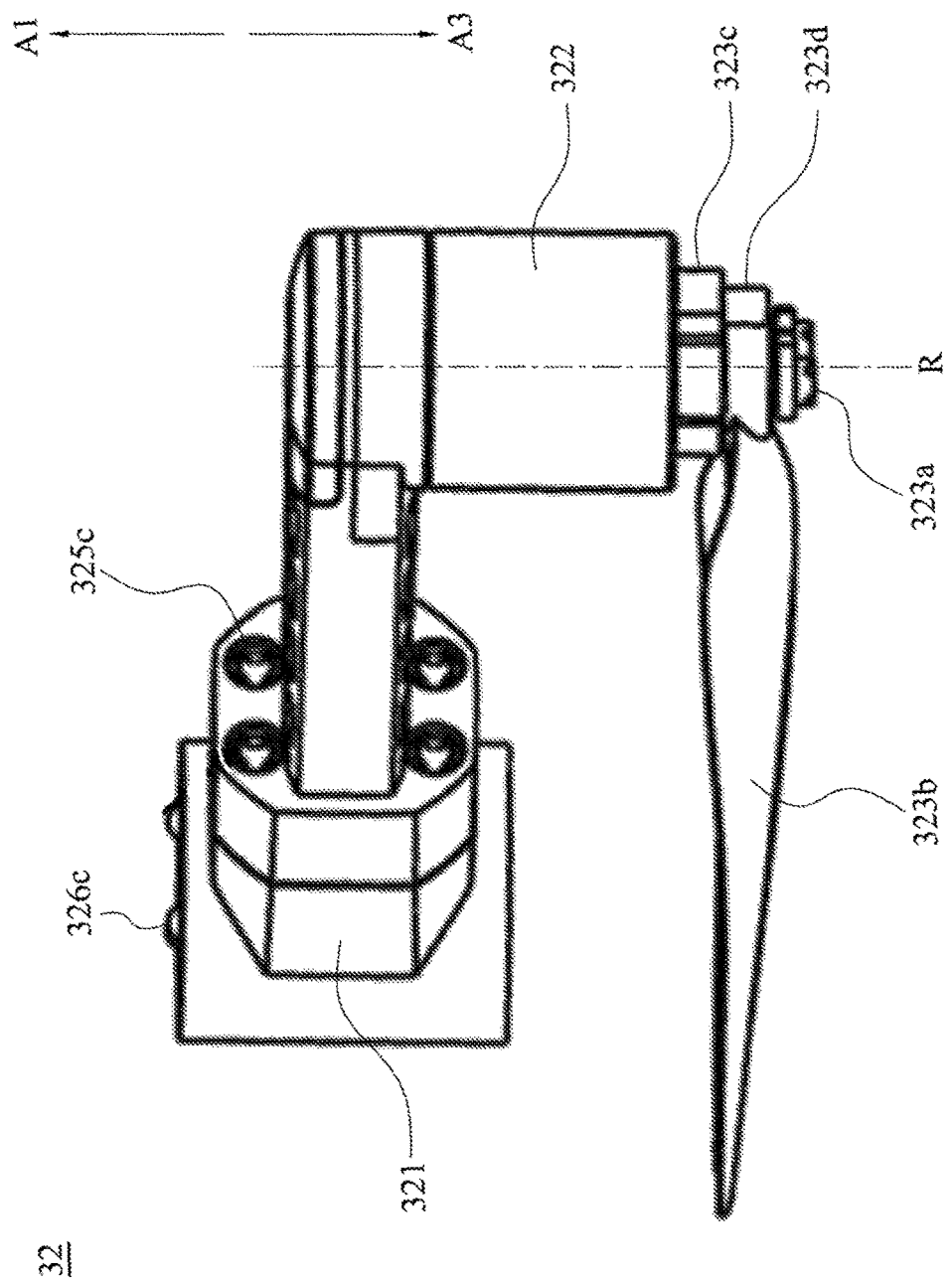
FIG. 5B is another perspective view of the arm assembly shown in FIG. 5A.

Reference is made to FIG. 5A and FIG. 5B. In an embodiment, the arm assembly 32 includes a first rotating member 321, a second rotating member 322, a propeller 323, and a shoulder joint 324 The second rotating member 322 is coupled to the adjoining first rotating member 321. The propeller 323 is coupled to the adjoining second rotating member 322 and has a rotatable axle 323a extending along a rotating axis R. The second rotating member 322 is configured to turn the propeller 323 by rotating the rotatable axle 323a about the rotating axis R, and the first rotating member 321 is configured to rotate and effect a movement of the second rotating member 322 so as to selectively adjust the rotatable axle 323a to align the rotating axis R at least with a first axial direction A1, a second axial direction A2, and a third axial direction A3 opposite to the first axial direction A1. In some embodiments, the unmanned vehicle 1 shown in FIG. 1A (and/or the unmanned vehicle 2 shown in FIG. 3A) can adopt a plurality of the arm assemblies 32. In some embodiments, the rotatable axle 323a of the arm assembly 32 can be adjusted to align the rotating axis R with the third axial direction A3 before the arm assembly 32 is accommodated in the accommodating space S, so as to make the arm assembly 32 be much closer to the vehicle body 10. As a result, the unmanned vehicle 1 can have a more compact size and occupy a much smaller space for transport and storage.

Figure 6:
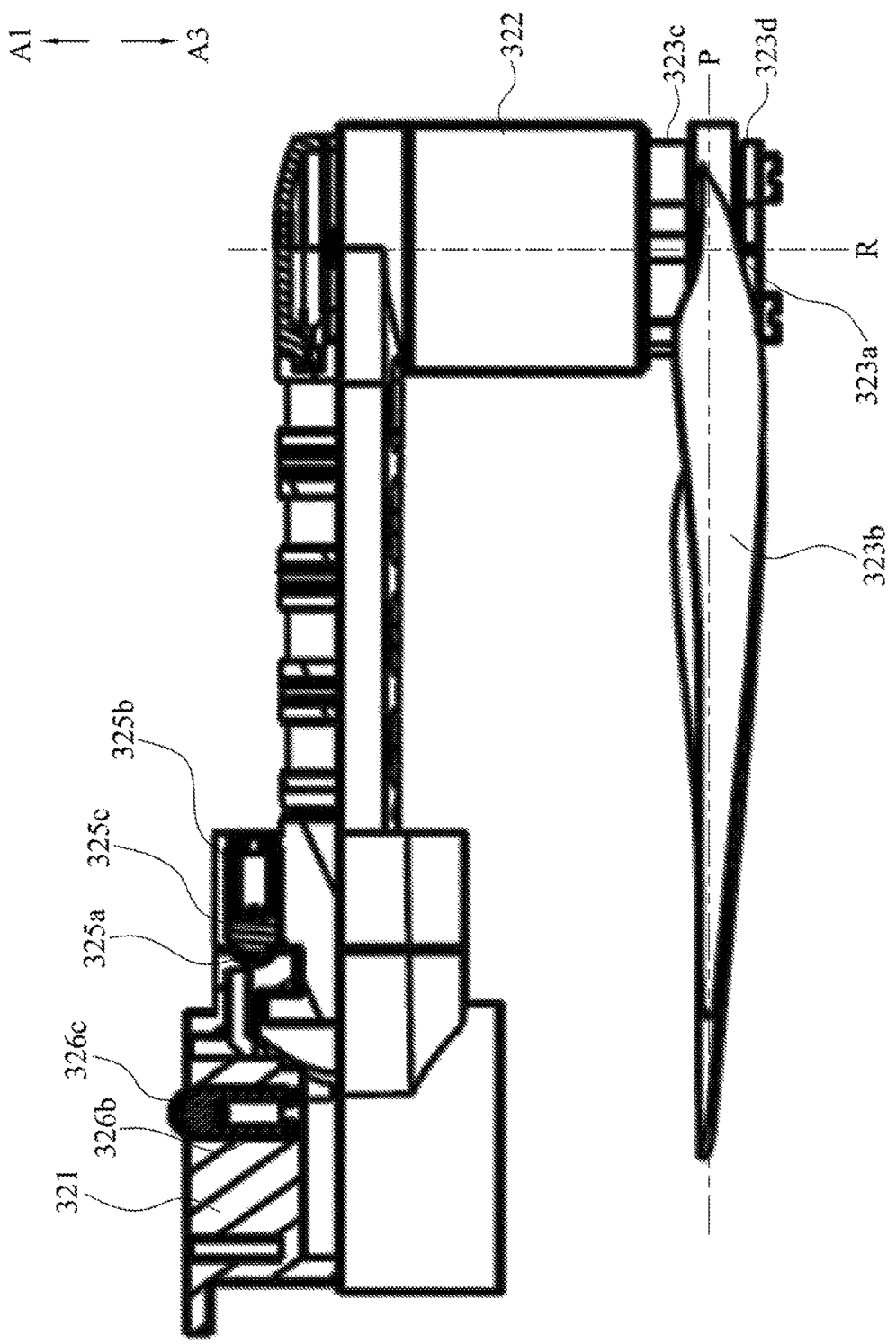
FIG. 6 is a cross-sectional view of the arm assembly taken along line 6-6 in FIG. 5A.

Reference is made to FIG. 6. As shown in FIG. 5B to FIG. 6, the propeller 323 has a rotational plane P perpendicular to the rotating axis R and includes a plurality of vanes 323b and a third rotating member 323c. The third rotating member 323c is coupled to the rotatable axle 323a. The vanes 323b are coupled to the third rotating member 323c. The third rotating member 323c is configured to rotate the vanes 323b to selectively spread from each other or close to each other along the rotational plane.

Specifically, the propeller 323 further includes a pivoting member 323d coupled to the third rotating member 323c at the center of the pivoting member 323d, and the vanes 323b are pivotally connected to opposite ends of the pivoting member 323d. As a result, the third rotating member 323c is configured to rotate the vanes 323b relative to the pivoting member 323d, so as to selectively spread the vanes 323b from each other or close the vanes 323b to each other. In some embodiments, the vanes 323b are substantially parallel to each other while being rotated to close to each other, as shown in FIG. 5A, but the disclosure is not limited in this regard. Accordingly, when the unmanned vehicle 3 is not in use, the vanes 323b rotated to close to each other allow the unmanned vehicle 3 to occupy a much smaller space for transport and storage.

As shown in FIG. 5A to FIG. 6, the unmanned vehicle 3 further includes a first positioning module disposed between the first rotating member 321 and the second rotating member 322. The first positioning module is configured to position the second rotating member 322 relative to the first rotating member 321 so as to selectively position the rotatable axle 323a to align the rotating axis R at least with the first axial direction A1, the second axial direction A2, and the third axial direction A3.

Specifically, the first positioning module includes a plurality of first positioning structures 325a, a first resilient member 325b, and a first pin 325c. The first positioning structures 325a are formed on the first rotating member 321. For example, each of the first positioning structures 325a is in form of indentation. An end of the first resilient member 325b is coupled to the second rotating member 322. The first pin 325c is coupled to another end of the first resilient member 325b. The first resilient member 325b is configured to press the first pin 325c to selectively engage one of the first positioning structures 325a during the rotation of the second rotating member 322 relative to the first rotating member 321. In some embodiments, the unmanned vehicle 1 shown in FIG. 1A adopts a plurality of the arm assemblies 32. The unmanned vehicle 1 further includes a second positioning module disposed between the vehicle body 10 and the arm assembly 32. The second positioning module is configured to position the first rotating member 321 relative to the vehicle body 10 so as to selectively position the arm assemblies 32 in or out of the accommodating spaces S.

Specifically, the second positioning module includes a plurality of second positioning structures (not shown, but can be referred to the first positioning structures 325a), a second resilient member 326b, and a second pin 326c. The second positioning structures are formed on an inner surface of the vehicle body 10. An end of the second resilient member 326b is coupled to the first rotating member 321. The second pin 326c is coupled to another end of the second resilient member 326b. The second resilient member 326b is configured to press the second pin 326c to selectively engage one of the second positioning structures during the rotation of the first rotating member 321 relative to the vehicle body 10.

Reference is made to FIG. 7. The unmanned vehicle 1 further includes a wireless signal receiver 162, a GPS module 163, a camera 164, a mini PCB 165, a controller 160, and a WIFI module 166. Although shown as separate units, the mini PCB 165 and the controller 160 can also be the same unit. The wireless signal receiver 162 is disposed on the main module 10a and electrically connected to the controller 160. The GPS module 163 is disposed on the main module 10a and electrically connected to the controller 160. The GPS module 163 is configured to generate a GPS path, and the controller 160 is further configured to control the first rotating members 121 and the second rotating members 122 of the arm assemblies 12 to cause the unmanned vehicle 1 to move and navigate according to the GPS path. The camera 164 is disposed on the main module 10a. The camera 164 is configured to generate a video stream. The mini PCB 165 is disposed on the main module 10a. The mini PCB 165 is configured to process the video stream. The WIFI module 166 is configured to wirelessly transmit the processed video stream.

According to the data received from the camera 164, the WIFI module 166, the Wireless signal receiver 162, or the GPS module 163, the unmanned vehicle can control the arm assembly 12 and/or the power unit 161 powering the arm assembly 12 to reconfigure the unmanned vehicle to an aerial or naval vehicle; and power/control the unmanned vehicle's operations and motions. For example, in an example situation, the unmanned vehicle configured as a naval vehicle propelling across water may be reaching barrier (e.g. land). The approach to barrier may be plotted by the GPS module 163 and/or notified by received wireless information and/or detected by the camera 164. In response to this, the controller 160 can instruct the arm assembly 12 to reconfigure the unmanned vehicle to an aerial vehicle to fly through the air, in order to continue proceeding along the planned pathway.

As another example, the GPS module 163 may plot a course through a more confined space terrain, which is confirmed by visual detection by the camera 164. In response to this, the arm assembly 12 is retracted to make the unmanned vehicle into a smaller size. Additionally, power can be reduced to navigate the unmanned vehicle slower and more carefully through this narrow space.

Figure 8:
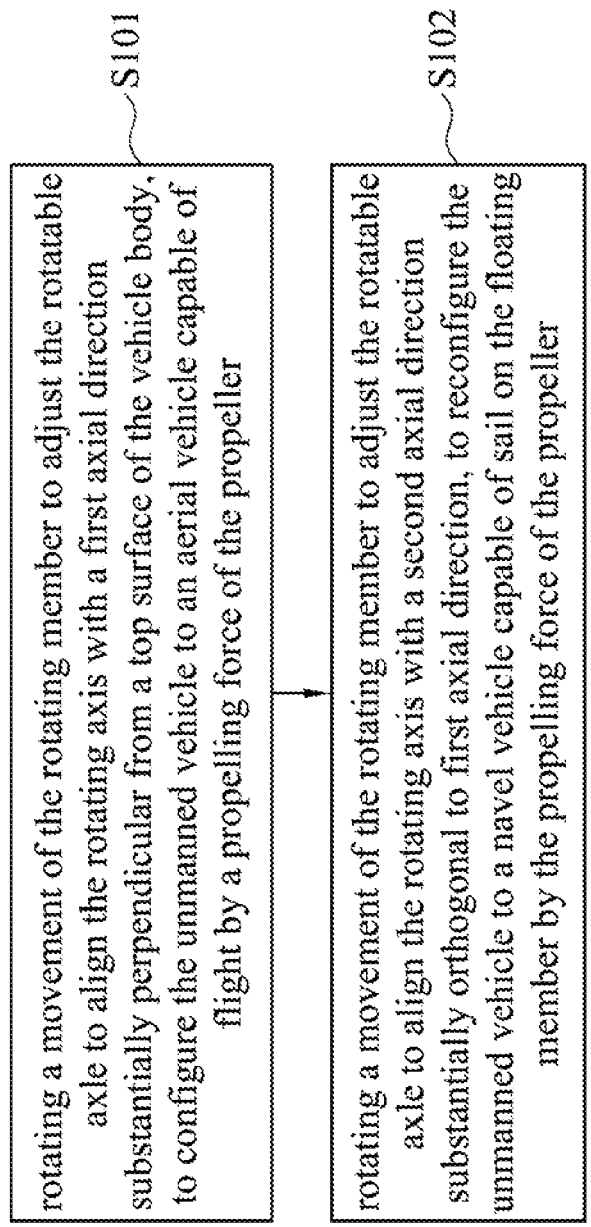
FIG. 8 is a flow chart of a method for controlling an unmanned vehicle according to an embodiment of the disclosure.

Reference is made to FIG. 8. FIG. 8 is a flow chart of a method for controlling an unmanned vehicle according to an embodiment of the disclosure. The unmanned vehicle includes a vehicle body, a floating member connected to a bottom surface of the vehicle body, and at least one arm assembly coupled to the vehicle body. The arm assembly includes a rotating member and a propeller. The propeller includes a rotatable axle extending along a rotating axis. The rotatable axle of the propeller is coupled to the rotating member and extends along a rotating axis. The method begins with operation S101 in which a movement of the rotating member is rotated to adjust the rotatable axle to align the rotating axis with a first axial direction substantially perpendicular from a top surface of the vehicle body, to configure the unmanned vehicle to an aerial vehicle capable of flight by a propelling force of the propeller. The method continues with operation S102 in which a movement of the rotating member is rotated to adjust the rotatable axle to align the rotating axis with a second axial direction substantially orthogonal to first axial direction, to reconfigure the unmanned vehicle to a navel vehicle capable of sail on the floating member by the propelling force of the propeller. It is envisaged that the method may also be performed by first configuring the unmanned vehicle to a navel vehicle as described in step S102, and then reconfiguring the unmanned vehicle to an aerial vehicle as described in step S101.

Figure 9:
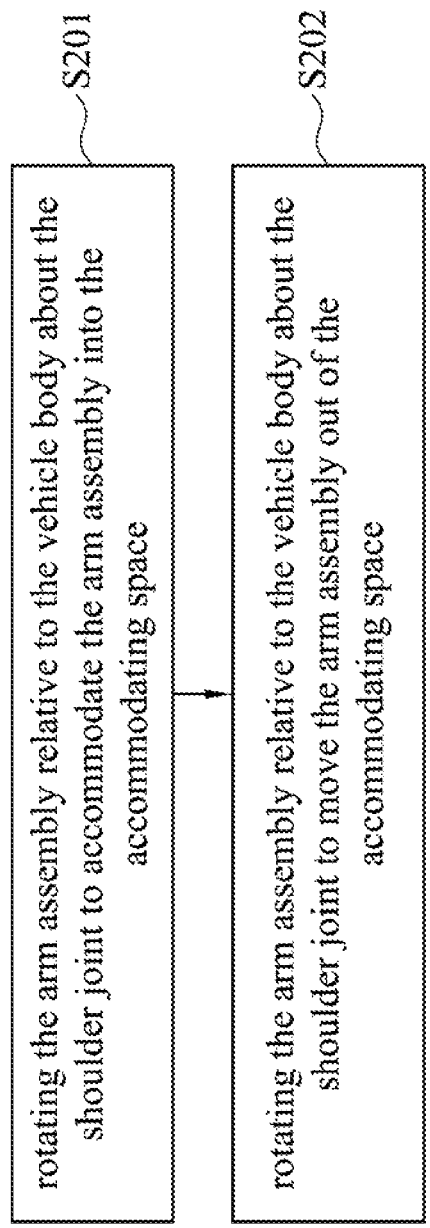
FIG. 9 is a flow chart of a method for controlling an unmanned vehicle according to another embodiment of the disclosure.

Reference is made to FIG. 9. FIG. 9 is a flow chart of a method for controlling an unmanned vehicle according to another embodiment of the disclosure. The unmanned vehicle includes a vehicle body, a floating member connected to a bottom surface of the vehicle body, and at least one arm assembly coupled to the vehicle body. The arm assembly includes a rotating member and a propeller. The propeller includes a rotatable axle extending along a rotating axis. The rotatable axle of the propeller is coupled to the rotating member and extends along a rotating axis. The vehicle body has at least one accommodating space. The unmanned vehicle further includes a shoulder joint connecting the arm assembly to the vehicle body. The method begins with operation S201 in which the arm assembly is rotated relative to the vehicle body about the shoulder joint to accommodate the arm assembly into the accommodating space. The method continues with operation S202 in which the arm assembly is rotated relative to the vehicle body about the shoulder joint to move the arm assembly out of the accommodating space. Similar to the embodiment described with reference to FIG. 8, the order of the method may be reversed, with the first configuration of the unmanned vehicle being moving the arm assembly out of the accommodating space and then accommodating the arm assembly into the accommodating space.

In some embodiments, the method of FIG. 9 further includes operation S203 in which before accommodating the arm assembly into the accommodating space, the rotatable axle is adjusted to align the rotating axis with a third axial direction opposite to the first axial direction (referring to FIG. 5A). Accordingly, when being accommodated into the accommodating space, the whole arm assembly can be much closer to the vehicle body, so that the unmanned vehicle can have a more compact size and occupy a much smaller space for transport and storage.

In some embodiments, the propeller has a rotational plane perpendicular to the rotating axis and includes a plurality of vanes capable of rotating about the rotatable axle. The method of FIG. 9 further includes operation S204 in which before accommodating the arm assembly into the accommodating space, the vanes are rotated about the rotatable axle to close to each other in the rotational plane (referring to FIG. 5A). Accordingly, when the unmanned vehicle is not in use, the vanes rotated to close to each other can also allow the unmanned vehicle to occupy a much smaller space for transport and storage.

According to the foregoing recitations of the embodiments of the disclosure, it can be seen that the unmanned vehicle of the disclosure can be a kind of amphibious vehicle (e.g., able to move both in the sky and on the water). As shown in the Figures, the unmanned vehicle includes modularized parts/units. The modularized design provides for ease of transport, storage, and parts replacement or parts upgrade. It will be apparent to those skilled in the art that various modifications and variations can be made to the structure of the present disclosure without departing from the scope or spirit of the disclosure.

What is claimed is:

1. An unmanned vehicle, comprising:
a vehicle body having at least one accommodating space;
at least one arm assembly coupled to the vehicle body, the arm assembly comprising:
a first rotating member;
a second rotating member coupled to the first rotating member; and
a propeller comprising a rotatable axle coupled to the second rotating member, wherein the rotatable axle extends along a rotating axis, and the second rotating member is configured to turn the propeller by rotating the rotatable axle about the rotating axis; and
a floating member connected to a bottom surface of the vehicle body;
wherein the first rotating member is configured to rotate and effect a movement of the second rotating member so as to selectively adjust the rotatable axle to align the rotating axis at least with a first axial direction and a second axial direction; and
wherein the arm assembly is capable of rotating relative to the vehicle body to selectively rotate into or out of the accommodating space.

2. The unmanned vehicle of claim 1, further comprising a plurality of the arm assemblies, wherein the vehicle body further has a plurality of the accommodating spaces respectively corresponding to the arm assemblies, and each of the arm assemblies is capable of rotating relative to the vehicle body to selectively rotate into or out of the corresponding accommodating space.

3. The unmanned vehicle of claim 2, wherein the arm assemblies respectively rotate into the accommodating spaces along a first rotational direction, and respectively rotate out of the accommodating spaces along a second rotational direction opposite to the first rotational direction.

4. The unmanned vehicle of claim 1, wherein the propeller has a rotational plane perpendicular to the rotating axis and comprises:
a third rotating member coupled to the rotatable axle; and
a plurality of vanes coupled to the third rotating member, wherein the third rotating member is configured to rotate the vanes to selectively spread from each other or close to each other along the rotational plane, and the vanes are substantially parallel to each other while being rotated to close to each other.

5. The unmanned vehicle of claim 1, further comprising a positioning module disposed between the first rotating member and the second rotating member, wherein the positioning module is configured to position the second rotating member relative to the first rotating member so as to selectively position the rotatable axle to align the rotating axis at least with the first axial direction and the second axial direction.

6. The unmanned vehicle of claim 5, wherein the positioning module comprises:
a plurality of positioning structures formed on the first rotating member;
a resilient member, an end of the resilient member being coupled to the second rotating member; and
a pin coupled to another end of the resilient member, wherein the resilient member is configured to press the pin to selectively engage one of the positioning structures during the rotation of the second rotating member relative to the first rotating member.

7. The unmanned vehicle of claim 1, further comprising a shoulder joint connecting the arm assembly to the vehicle body, wherein the arm assembly is configured to pivot about the shoulder joint and rotate relative to the vehicle body.

8. The unmanned vehicle of claim 7, further comprising a positioning module disposed between the vehicle body and the arm assembly, wherein the positioning module is configured to position the first rotating member relative to the vehicle body so as to selectively position the arm assembly in or out of the accommodating space.

9. The unmanned vehicle of claim 8, wherein the positioning module comprises:
a plurality of positioning structures formed on the vehicle body;
a resilient member, an end of the resilient member being coupled to the first rotating member; and
a pin coupled to another end of the resilient member, wherein the resilient member is configured to press the pin to selectively engage one of the positioning structures during the rotation of the first rotating member relative to the vehicle body.

10. The unmanned vehicle of claim 1, wherein the vehicle body comprises:
a main module; and
a connecting member detachably connected to the main module, wherein the arm assembly is connected to the connecting member.

11. The unmanned vehicle of claim 1, further comprising:
a controller configured to control a movement of the first rotating member and a movement of the second rotating member; and
a power unit configured to supply power to move the first rotating member and the second rotating member.

12. The unmanned vehicle of claim 1, wherein the first axial direction is substantially perpendicular to a top surface of the vehicle body, and the second axial direction is substantially orthogonal to the first axial direction.

13. The unmanned vehicle of claim 1, wherein the floating member is an inflatable air cushion.

14. A method for controlling the unmanned vehicle of claim 1, the method comprising at least one of:
adjusting the rotable
axle to align the rotating axis with a first axial direction substantially perpendicular from a top surface of the vehicle body, to configure the unmanned vehicle to an aerial vehicle capable of flight by a propelling force of the propeller; and
adjusting the rotatable axle to align the rotating axis with a second axial direction substantially orthogonal to the first axial direction, to configure the unmanned vehicle to a navel vehicle capable of sail on the floating member by the propelling force of the propeller.

15. The method of claim 14, wherein the vehicle body has at least one accommodating space, the unmanned vehicle further comprises a shoulder joint connecting the arm assembly to the vehicle body, and the method further comprises at least one of:
rotating the arm assembly relative to the vehicle body about the shoulder joint to accommodate the arm assembly into the accommodating space; and rotating the arm assembly relative to the vehicle body about the shoulder joint to move the arm assembly out of the accommodating space.

16. The method of claim 15, further comprising:

before accommodating the arm assembly into the accommodating space, adjusting the rotatable axle to align the rotating axis with a third axial direction opposite to the first axial direction.

17. The method of claim 15, wherein the propeller has a rotational plane perpendicular to the rotating axis and comprises a plurality of vanes capable of rotating about the rotatable axle, and the method further comprising:

before accommodating the arm assembly into the accommodating space, rotating the vanes about the rotatable axle to close to each other in the rotational plane.

* * * * *